US007054955B2

(12) United States Patent
Chen et al.

(10) Patent No.: US 7,054,955 B2
(45) Date of Patent: May 30, 2006

(54) SYSTEM AND METHOD FOR RECOVERING FROM A FAILED SYNCHRONIZATION SESSION

(75) Inventors: James S. L. Chen, Mississauga (CA); Stephen D. Flanagin, Sammamish, WA (US); Brian Moore, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 885 days.

(21) Appl. No.: 09/893,170

(22) Filed: Jun. 27, 2001

(65) Prior Publication Data

US 2003/0005161 A1   Jan. 2, 2003

(51) Int. Cl.
*G06F 15/16* (2006.01)

(52) U.S. Cl. .................. 709/248; 707/201; 707/203; 714/12; 714/15

(58) Field of Classification Search ................ 709/248; 707/201–203
See application file for complete search history.

(56) References Cited

U.S. PATENT DOCUMENTS

| 5,434,994 | A | | 7/1995 | Shaheen et al. | ............ | 395/500 |
| 5,546,574 | A | | 8/1996 | Grosskopf et al. | .......... | 395/600 |
| 5,926,816 | A | | 7/1999 | Bauer et al. | .................. | 707/8 |
| 6,317,754 | B1 | * | 11/2001 | Peng | ......................... | 707/203 |
| 6,341,316 | B1 | * | 1/2002 | Kloba et al. | ................ | 709/248 |
| 6,460,051 | B1 | * | 10/2002 | LaRue et al. | ................ | 707/201 |
| 2002/0156798 | A1 | * | 10/2002 | LaRue et al. | ................ | 707/201 |
| 2003/0046442 | A1 | * | 3/2003 | Maryka et al. | ............. | 709/316 |
| 2004/0105423 | A1 | * | 6/2004 | Koehler et al. | ............. | 370/351 |
| 2005/0021514 | A1 | * | 1/2005 | Barga et al. | .................. | 707/3 |

FOREIGN PATENT DOCUMENTS

WO    WO 97/04389    2/1997

OTHER PUBLICATIONS

Cimet et al., "A Resilient Distributed Protocol for Network Synchronization;" *Proceedings of the ACM SIGCOMM Conference on Communications Architecture & Protocols*; 1986, pp. 358-367.
Sharrock et al., "A Framed, Movable-Boundary Protocol for Integrated Voice/Data in a LAN;" *Proceedings of the ACM SIGCOMM Conference on Communications Architecture & Protocols*; 1986, pp. 111-119.
Tepper, D., "Synchronizing a Satellite Network;" *Proceedings of the $22^{nd}$ Annual Symposium on Simulation*; 1989, pp. 33-46.
Cristian, F., "Understanding Fault-Tolerant Distributed Systems;" *Commun. ACM* 34:2 (Feb. 1991), pp. 56-78.

* cited by examiner

*Primary Examiner*—Wen-Tai Lin
(74) *Attorney, Agent, or Firm*—Merchant & Gould; Ryan T. Grace (57) ABSTRACT

A system and method is described for recovering from a failed synchronization session between a first data store and a second data store. Once a failed synchronization session is detected, a synchronization recovery process is performed. The synchronization recovery process includes creating an update manifest based on a sync request and on a synchronization state table. The synchronization state table is updated for each sync request initiating a synchronization session, whether the synchronization session succeeded or failed. The update manifest may include one or more objects and an update action associated with each of the objects. The update action may be identical to a current action specified in the sync request for the object, identical to a last action stored in the synchronization state table for the object, or different from both the current action and the last action. In general, the update action minimizes the likelihood of duplicate objects.

19 Claims, 9 Drawing Sheets

| MANIFEST | | | |
|---|---|---|---|
| ACTION | OBJECT ID | PROPERTY | NEW VALUE |
| CHANGE | XXXX123 | LAST MOD. | {NEW DATE} |
| DELETE | XXXX010 | MESSAGE | {NULL} |
| CHANGE | XXXX747 | READ FLAG | {READ} |
| CHANGE | XXXX362 | MESSAGE | {POINTER} |
| DELETE | XXXXXXX | MESSAGE | {NULL} |

| SYNCHRONIZATION STATE TABLE |
|---|
| LAST SYNC KEY — 702 |
| WATERMARK — 704 |
| PREVIOUS WATERMARK — 706 |
| LAST MANIFEST — 708 |
| PRIOR INCREMENTAL WATERMARKS — 710 |

900 — Process Of Testing For Synchronization Failure

Fig. 10

| Case | Last Saved Manifest | Current Manifest | Update Manifest | Criteria For Creating The Update Manifest |
|---|---|---|---|---|
| 1 | Add | Add | Add or Change | If ServerID In RST, Resubmit As Change. If Server Id Does Not Exist, Submit The Add |
| 2 | Add | Change | None | Send Error To Client |
| 2.5 | Add | Delete | None | Send Error To Client |
| 3 | Add | Object Inexistent | Delete | Newly Added Object Is Deleted, Resubmit as Delete |
| 4 | Delete | Add | None | Send Error To Client |
| 5 | Delete | Delete | Delete | Submit As Delete, In Case Server Failed Prior Time |
| 6 | Delete | Change | None | Send Error To Client |
| 7 | Change | Add | None | Send Error To Client |
| 8 | Change | Change | Change | Submit As Change In Order To Update Any Differences |
| 9 | Change | Delete | Delete | Submit As Delete |
| 10 | Delete | O-N-E | None | Do Nothing (error case; but nothing sent to the client) |
| 11 | Change | O-N-E | None | Do Nothing (error case; but nothing sent to the client) |
| 12 | O-N-E | Add | Add | Perform the new Add operation |
| 13 | O-N-E | Change | Change | Perform the new Change operation |
| 14 | O-N-E | Delete | Delete | Perform the new Delete operation |

*Fig. 11*

SYSTEM AND METHOD FOR RECOVERING FROM A FAILED SYNCHRONIZATION SESSION

TECHNICAL FIELD

The present invention relates to synchronization between mobile devices and fixed devices, and, more specifically, to systems for recovering from a failed synchronization session between the mobile device and the fixed device.

BACKGROUND OF THE INVENTION

Mobile devices have become quite common today. The users of these mobile devices want to have their mobile devices updated with current information quite frequently. The process for updating information involves communicating with a fixed device (i.e., server) and is commonly referred to as a synchronization session. Synchronization sessions between mobile devices and servers are quite different from synchronization sessions between hard-wired devices and servers. For example, synchronization sessions between mobile devices and servers are more prone to lost or terminated transmissions. If there is a lost or terminated transmission, the information on the mobile device and on the server may not be identical. Thus, there is a need for an efficient method for recovering from a failed synchronization session due to a lost or terminated transmission that ensures a successful update to both the mobile device and the server.

SUMMARY OF THE INVENTION

Briefly described, the present invention provides a method for recovering from a failed synchronization session. The recovery detection method is able to identify a sync failure with a minimal amount of data transmitted between the two devices, and thus, provides an economic method of recovering from a failed synchronization session using wireless technology. The method achieves this recovery without requiring the server to maintain and track errors of the client, without waiting for an explicit acknowledgement from the client, and without other time consuming and bandwidth intensive tasks.

In general, the method includes detecting and recovering from a failed prior synchronization session. In one embodiment, a failed synchronization session is detected by comparing a sync key transmitted by the mobile device in a sync request to a prior sync key stored in a synchronization state table. For this embodiment, a failed synchronization session is detected when the request sync key is one less than the prior sync key. Once a failed synchronization session is detected, a synchronization recovery process is performed. The synchronization recovery process includes creating an update manifest based on the sync request and the synchronization state table. In one embodiment, the update manifest includes one or more objects and an update action associated with each of the objects. The update action may be identical to a current action specified in the sync request for the object, identical to a last action stored in the synchronization state table for the object, or different from both the current action and the last action. In general, the update action that is specified minimizes the likelihood that duplicate objects are created in either data store. Once the server data store is updated, the synchronization state table is updated.

In another aspect of the invention, the present invention provides a system that recovers from a failed synchronization session between a first data store and a second data store. The system includes a first device associated with the first data store, a second device associated with the second data store, and a server. The server is coupled to a storage medium on which a synchronization state is stored. The synchronization state is updated for each successful and failed synchronization session. The server is configured to access the synchronization state upon receiving a synchronization request and to determine whether a prior synchronization session failed. If the prior synchronization session failed, the server is configured to initiate a recovery synchronization session. The recovery synchronization session includes creating an update manifest based on the synchronization state and the synchronization request. The update action may be identical to a current action specified in the synchronization request for the object, identical to a last action stored in the synchronization state for the object, or different from both the current action and the last action. In general, the update action that is specified minimizes the likelihood that duplicate objects are created in either data store. Once the server data store is updated, the synchronization state is updated.

DETAILED DESCRIPTION OF THE PREFERRED EMBODIMENT

The present invention may be implemented in one or more components operating within a distributed or wireless computing network. Those components may include software programs or applications operating on computing systems of various configurations. Two general types of computing systems are being used to implement the embodiments of the invention described here. Those two general types are illustrated in FIG. 1 and FIG. 2 and described below, followed by a detailed discussion of one illustrative implementation of the invention, illustrated in FIGS. 3–11, based on these two types of computer systems.

Illustrative Operating Environment

Figure 1:
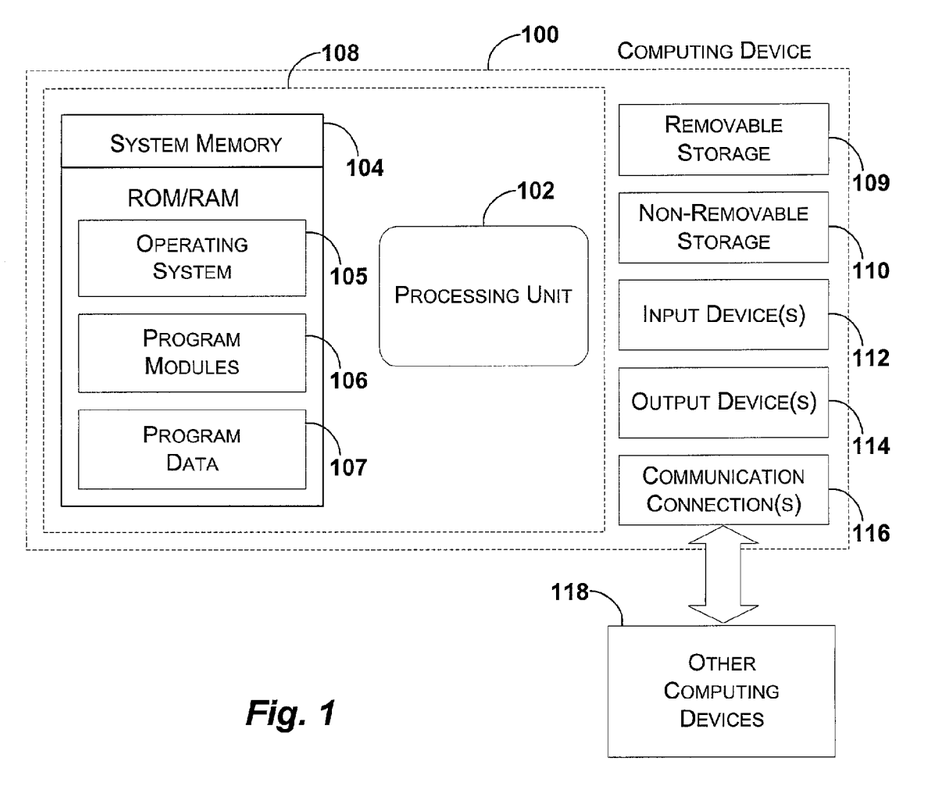
FIG. 1 illustrates an exemplary computing device that may be used in one exemplary embodiment of the present invention.
Figure 2:
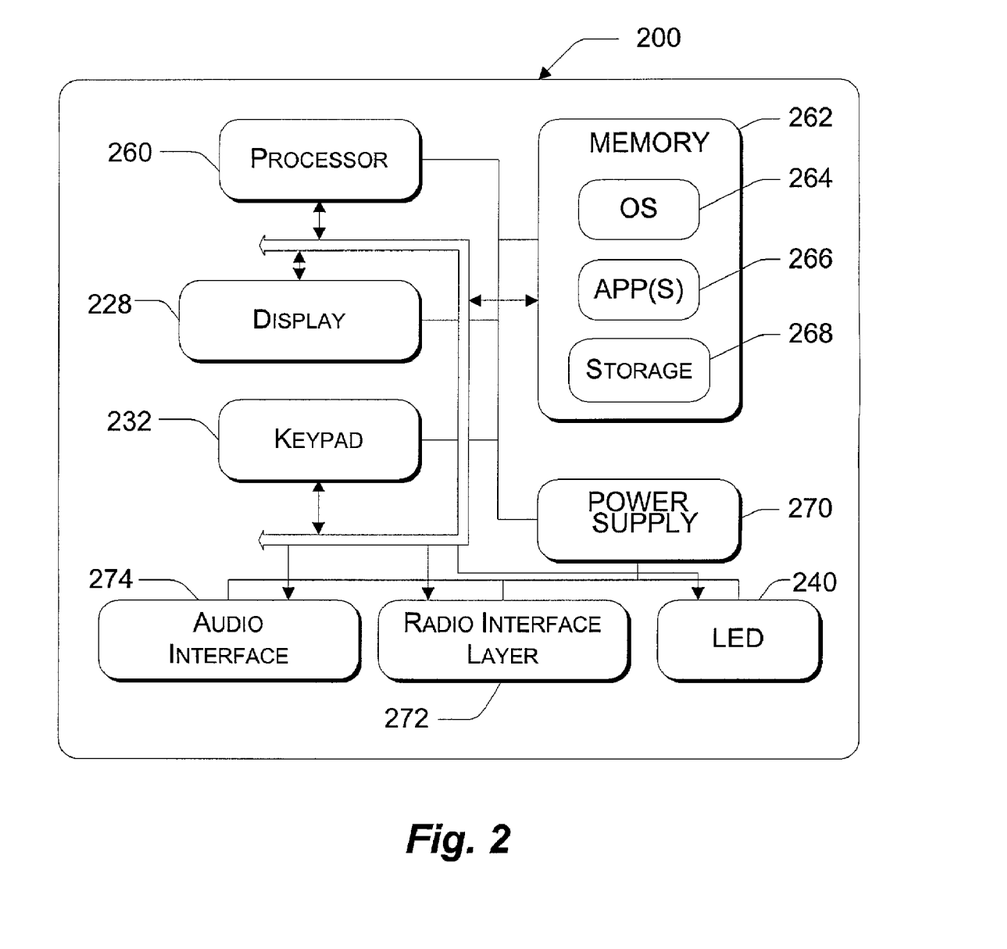
FIG. 2 illustrates an exemplary mobile computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

With reference to FIG. 2, one exemplary system for implementing the invention includes a mobile computing device, such as mobile computing device 200. The mobile computing device 200 has a processor 260, a memory 262, a display 228, and a keypad 232. The memory 262 generally includes both volatile memory (e.g., RAM) and non-volatile memory (e.g., ROM, Flash Memory, or the like). The mobile computing device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile computing device 200 also includes nonvolatile storage 268 within the memory 262. The nonvolatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing application, and the like. A synchronization application also resides on the mobile computing device 200 and is programmed to interact with a corresponding synchronization application resident on a host computer to keep the information stored in the storage 268 synchronized with corresponding information stored at the host computer.

The mobile computing device 200 has a power supply 270, which may be implemented as one or more batteries. The power supply 270 might further include an external power source, such as an AC adapter or a powered docking cradle, that supplements or recharges the batteries.

The mobile computing device 200 is also shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

Illustrative Synchronization Recovery System

Figure 3:
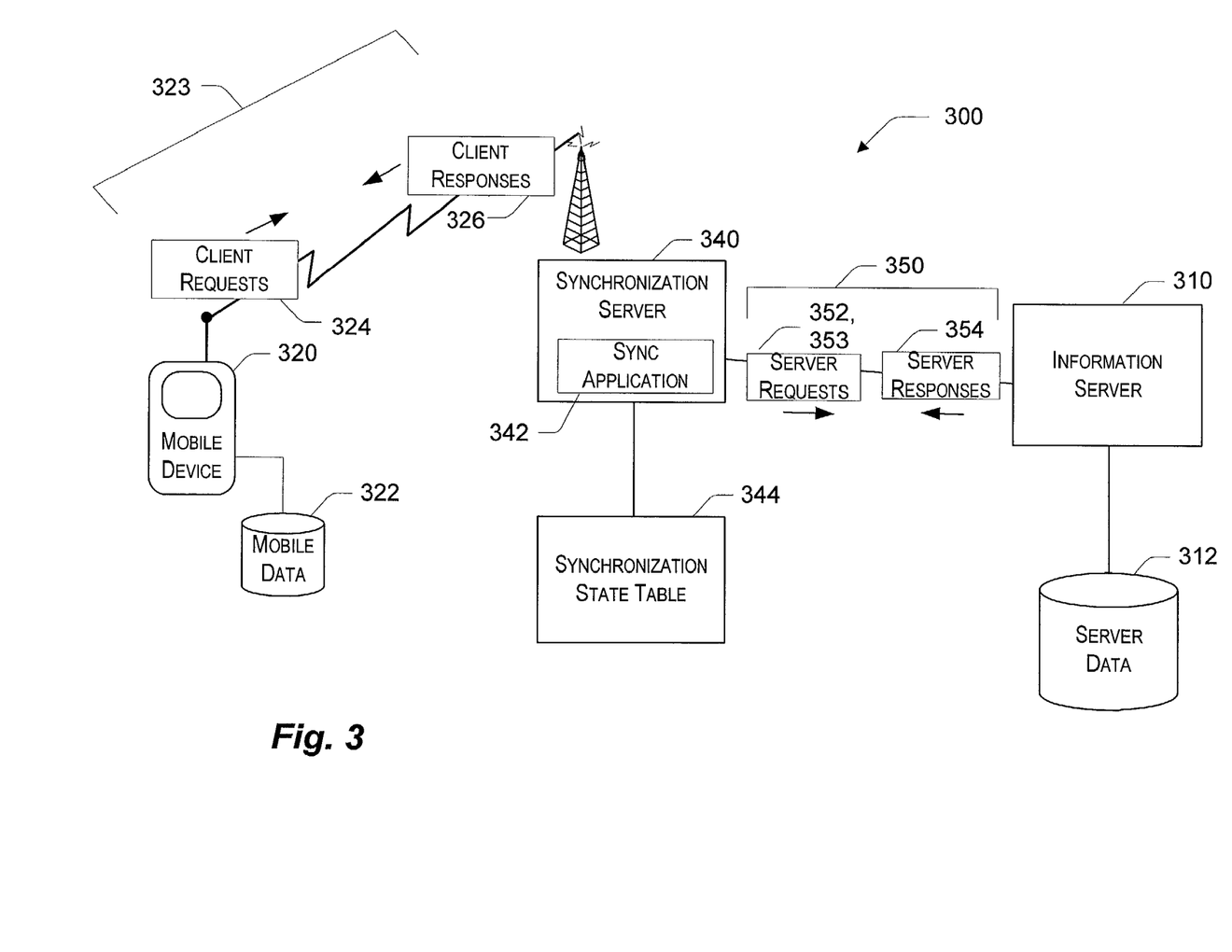
FIG. 3 is a functional block diagram of one exemplary synchronization recovery system as implemented using the computer device shown in FIG. 1 and the mobile computing device shown in FIG. 2.

FIG. 3 is a functional block diagram generally illustrating one embodiment for a synchronization recovery system 300 for recovering from a failed synchronization session between a fixed computing device, such as an information server 310 and a mobile device 320, in accordance with the present invention. For the purposes of the following discussion, the term session refers to the period devoted to synchronization activities. In one embodiment, the synchronization session includes a single request/response. In this implementation, the information server 310 is a computing device such as the one described above in conjunction with FIG. 1, and the mobile device 320 (i.e., client) is a mobile computing device such as the one described above in conjunction with FIG. 2. A synchronization application 342 performs the synchronization process between the information server 310 and the mobile device 320. In the embodiment illustrated, the synchronization application 342 resides on a synchronization server 340, which is a computing device as described above in conjunction with FIG. 1. The synchronization server 340 is shown coupled to the information server 310 over a local or wide area network in the conventional manner. In another embodiment, the synchronization application 342 may reside on information server 310 without departing from the scope of the present invention.

The mobile device 320 maintains mobile data 322 (i.e., a mobile data store) locally in its non-volatile storage 268 (shown in FIG. 2). Information server 310 maintains server data 312 (i.e., a server data store) on its removable storage 109 or non-removable storage 110 (shown in FIG. 1). As mentioned earlier, the mobile data 322 and the server data 312 may include e-mail or other messages used by an e-mail application, contact information used by a PIM, appointment information used by a scheduling program, and the like. Typically, each type of information in the mobile data 322 or server data 312 is referred to as a "collection" (e.g., e-mail and contacts are two separate collections). The mobile device 320 may change the mobile data 322 on the mobile device 320 at anytime. Once the mobile data 322 is changed, server data 312 accessible by the information server 310 will not have identical information. Similarly, the information server 310 may change the server data 312, such as through any number of networked personal computers (not shown) connected to the information server 310. Again, once the server data 312 is changed, the mobile data 322 and server data 312 are no longer identical (i.e., data is not synchronized). In order for the mobile data 322 and the server data 312 to become identical (i.e., synchronized), typically, the mobile device 320 initiates a synchronization session.

Figure 4:
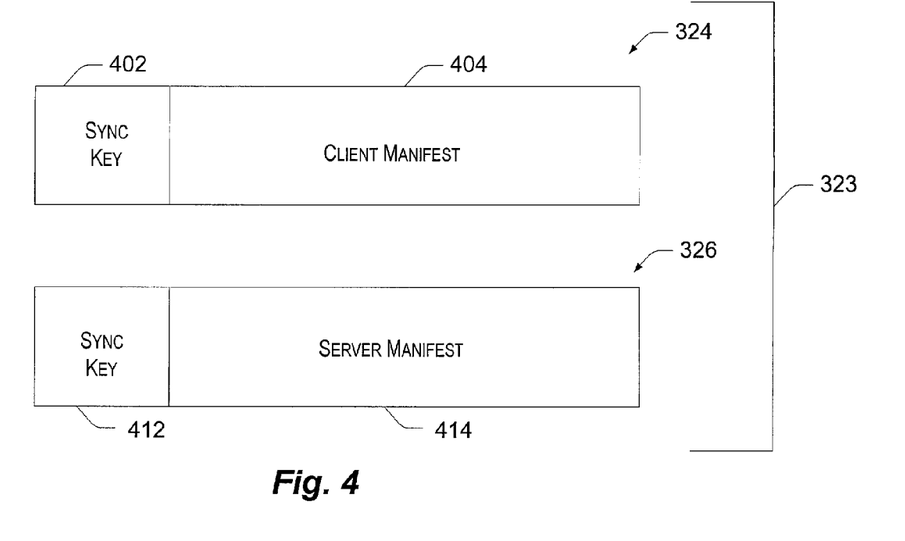
FIG. 4 is a graphical representation of one embodiment of client synchronization data exchanged during a synchronization session.

Briefly, during the synchronization session, client synchronization data 323 is transmitted between the mobile device 320 and the synchronization application 342 through wireless technology, and server synchronization data 350 is transmitted between the synchronization application 342 and the information server 310. The client synchronization data 323 includes client requests 324 sent by the mobile device 320 and client responses 326 sent by the synchronization application 342 to the mobile device 320. The client requests 324 specify changes to the mobile data 322 since the last successful synchronization session. The client responses specify changes to the server data 312 since the last successful synchronization session. The client requests 324 and the client responses 326 are illustrated in FIG. 4 and described in greater detail below. The synchronization application 342 saves information regarding the synchronization session in a synchronization state table 344.

Thus, by using the synchronization state table 344, client requests 324, and client responses 326 in accordance with the present invention, the synchronization application 342 is able to detect and handle "old" client requests 324 that have already been updated on the server data 312 without duplicating processing (i.e., creating duplicate objects) on the information server 310. In addition, the synchronization application 342 can perform incremental updates to the mobile device 320 to resynchronize the mobile data 322 and the server data 312 after a failed synchronization session without re-transmitting the entire server data 312 to the mobile device 320. Thus, providing an efficient method for recovering from a failed synchronization session using wireless technology.

Figure 6:
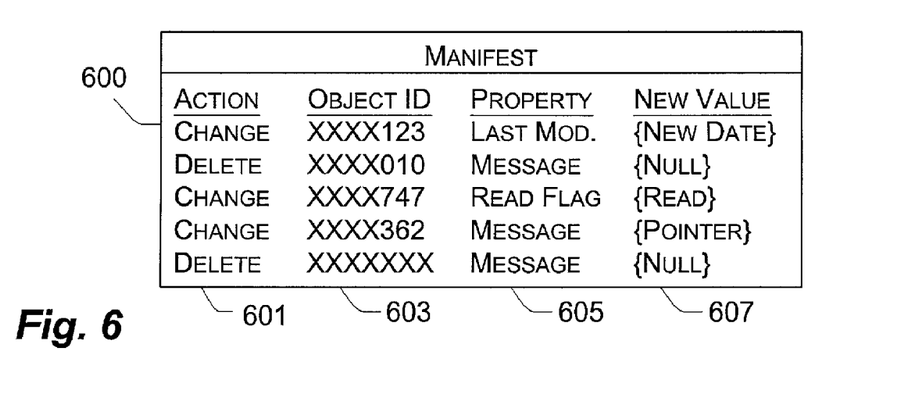
FIG. 6 is a graphical representation generally illustrating the salient portions of a sample manifest suitable for use in the synchronization data shown in FIGS. 5 and 6.

FIG. 4 is a graphical representation of one embodiment of client synchronization data 323 exchanged during a synchronization session. In the illustrated embodiment, the synchronization data 323 includes a client request 324 and a client response 326. The client request 324 includes a sync key 402 and a client manifest 404. The sync key 402, described in a co-pending application entitled "SYNC KEY" which is commonly owned and filed on the same date as the current application, provides one illustrative method for synchronizing data using wireless technology. The method for detecting a failed synchronization session using the sync key 402 will be described in greater detail below. The client manifest 404 identifies information that has changed in the mobile data 322 since the last successful synchronization session or may identify information that the mobile device 320 wants from the server data 312. For example, in one embodiment, if the client manifest 404 is null, the synchronization application 342 sends all the currently stored server data 312 to the mobile device 320 to store as mobile data 322. A representative client manifest 404 is illustrated in FIG. 6 and described below.

The client response 326 includes a sync key 412 and a server manifest 414. The server manifest 414 identifies information that has changed in the server data 312 that must be updated in the mobile data 322. A representative server manifest 414 is illustrated in FIG. 6 and described below. The sync key 412 in the client response 326 is similar to the sync key 402 described in the client request 324. Again, an illustrative embodiment for using the sync key 412 in the client response 326 is described in the co-pending application entitled "SYNC KEY" referred to above. In the aforementioned embodiment, a value stored in the sync key 402 in the client request 324 having the same value as the value stored in the sync key 412 of the client response 326 indicates a successful synchronization session.

Figure 5:
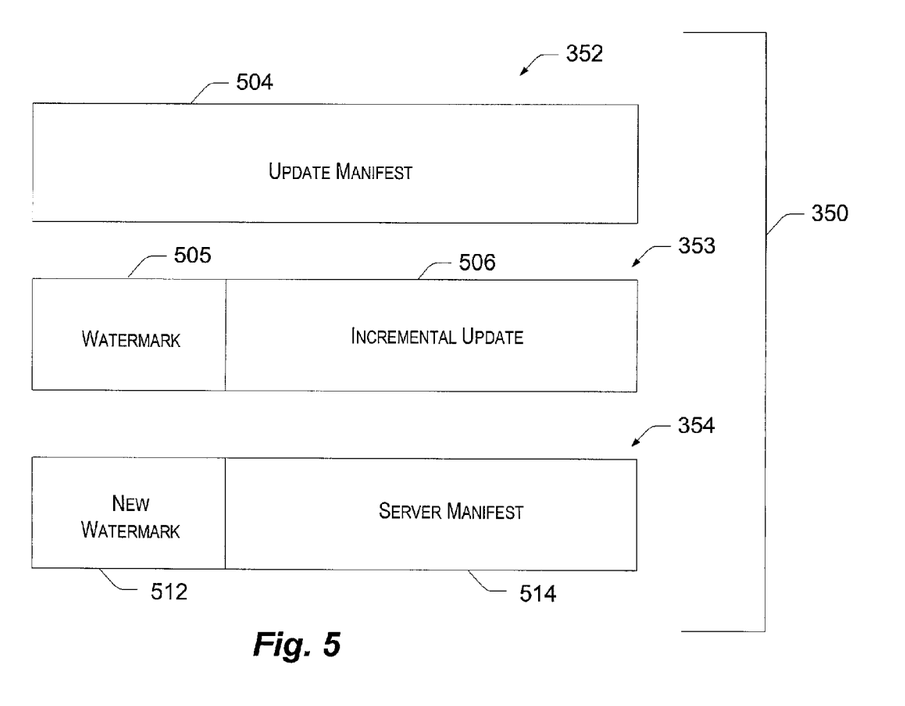
FIG. 5 is a graphical representation of one embodiment of server synchronization data exchanged during a synchronization session.

FIG. 5 is a graphical representation of one embodiment of server synchronization data 350 exchanged between the synchronization application 342 and the information server 310 during a synchronization session. In the illustrated embodiment, the server synchronization data 350 includes a server update processing 352, a server sync request 353, and a server response 354. The server update processing 352 includes an update manifest 504, which is created by the synchronization application 342 based on one or more client manifests 404. The update manifest 504 lists the updates from the mobile data 322 that need to be updated in the server data 312.

Once a client request 324 for synchronization is received, the synchronization application 342 sends a server sync request 353 to the information server 310. The server sync request 353 includes a watermark 505 and an incremental update 506. The watermark 505 identifies the last successful synchronization transaction so that the information server 310 knows which new data must be sent. The incremental update 506 corresponds to changes that were made from the synchronization application 342 to the information server 310 since the last synchronization session.

In response to the server sync request 353, the information server 310 transmits to the synchronization application 342 a server response 354. The server response includes a server manifest 514 and a new watermark 512. The server manifest 514 identifies the information that has changed in the server data 312 since the synchronization transaction identified by the watermark 505. A representative server manifest 514 is illustrated in FIG. 6 and described below. The new watermark 512 is a value that will be used in the future (in the same manner as watermark 505) to identify the state of the current synchronization transaction if successful.

In one embodiment, in which the information server 310 incorporates the Microsoft® Exchange Server suite of software, the incremental update 506 may use "CollBlobs" and "AddBlobs" in a well-known manner. Briefly, a CollBlob is a list of the item identifiers (IDs) stored in the server data 312 and their version at the time (i.e., checkpoint) at which the manifest or update was sent. Typically, the checkpoint refers to a position in time at which the information server 310 has synchronized. In addition, the checkpoint may be thought of as corresponding to a state for each object in the server data 312. An AddBlob is a list of the item IDs and their version that were added or changed by the sync application. Thus, in one implementation, the watermarks 505, 512 may be CollBlobs.

If the client response 326 is lost or terminated, the watermark associated with the server data 312 that identifies the state at which the information server 310 believes it has been synchronized may not correspond to the same state at which the mobile data 322 is synchronized. As will be illustrated in FIGS. 8–11 and described below, the present invention performs a synchronization recovery process from a prior watermark, which may be different than the watermark identified for the last successful synchronization session.

FIG. 6 is a graphical representation generally illustrating the salient portions of a sample manifest 600 that may be used as a client manifest 404, an update manifest 504 or a server manifest 414 in conjunction with present invention. In the sample manifest 600, there are four columns of information: an action column 601, an ID column 603, a new property column 605, and a new value column 607. The ID column 603 identifies the particular item (e.g., an e-mail message) to which the record in the manifest 600 pertains. For example, an item in the collection could be an e-mail message identified by the Object ID "XXXX123." The property column 605 identifies the particular property of the item, such as a last modified time, or the like. The new value column 607 identifies the value to which the property has changed since the last synchronization. In this example, the property column 605 may identify the entire object, such as an entire e-mail message, or a property of that object, such as the subject field of an e-mail message or the telephone number of a contact. Thus, in one embodiment, once an object ID is listed in the ID column 603, all the properties associated with that object and all the property values for that object are included in the manifest. In another embodiment, just the new values for the property are included in the manifest. The action column 601 identifies the particular action to perform on the property.

Figure 7:
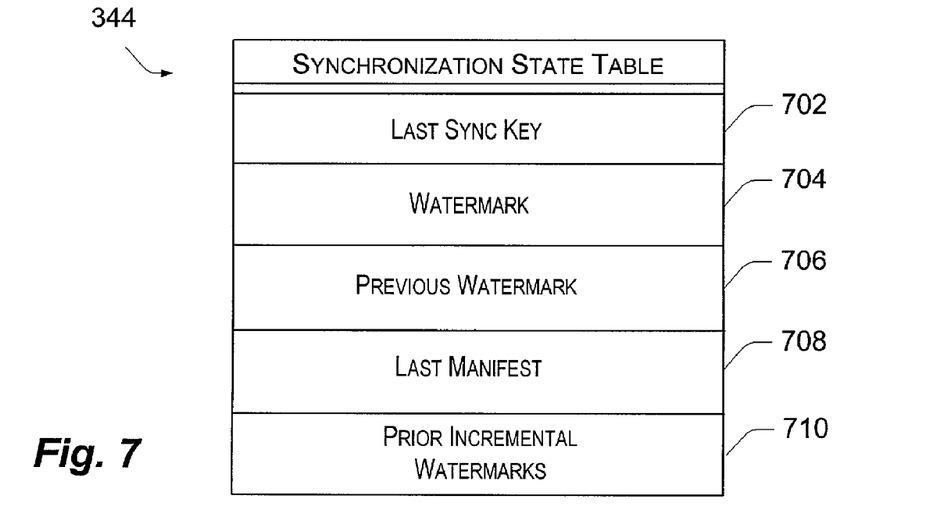
FIG. 7 is a graphical representation generally illustrating the salient portions of a sample synchronization state table shown in FIG. 3.

FIG. 7 is a graphical representation generally illustrating the salient portions of a sample synchronization state table 344 used in conjunction with the present invention. As mentioned earlier, the synchronization application 342 maintains the synchronization state table 344 in order to recover from a failed synchronization session in accordance with the present invention. In one embodiment, the sample synchronization state table 344 includes a last sync key entry 702, a watermark entry 704, a previous watermark entry 706, a last manifest entry 708, and an incremental watermarks entry 710.

The last sync key entry 702 stores the sync key 402 from the last client request 324. The watermark entry 704 stores a state identifier identifying a state within the server data 312 at which the information server 310 believes it has synchronized. In one embodiment, the watermark entry 704 may store the last CollBlob received in the server response 354. The previous watermark entry 706 stores the state identifier for a location within the server data at which the information server 310 and the mobile device 320 were successfully synchronized. In one embodiment, the previous watermark entry 706 may store a prior CollBlob. The last manifest entry 708 contains one or more client update commands from the client request 324. In another embodiment, the last manifest entry 708 may contain a merged manifest based on the one or more client manifests that have not successfully been synchronized. The incremental watermarks entry 710 identifies the information that has been transmitted to the information server 310 from the mobile data 322 since the last successful synchronization transaction (identified by the previous watermark 706). In one embodiment, the incremental watermarks entry 710 may contain AddBlobs. The synchronization state table 344 may be stored as a file in a hidden directory on the synchronization server 340. One skilled in the art will appreciate that the synchronization state table 344 may also contain other information that is not pertinent to the discussion of the present invention.

Figure 8:
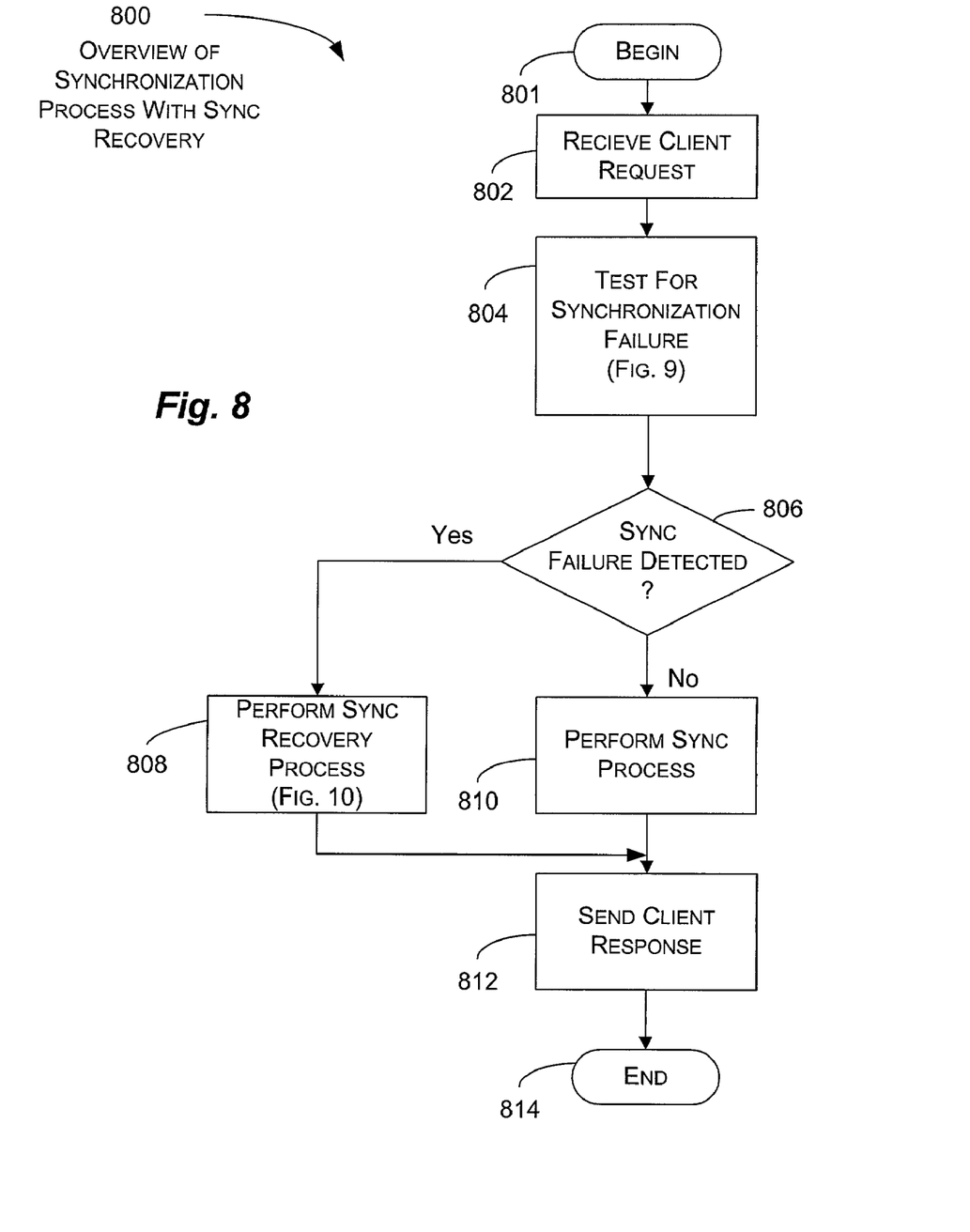
FIG. 8 is a logical flow diagram generally illustrating an overview of a process for recovering from a failed synchronization session.

FIG. 8 is a logical flow diagram generally illustrating an overview of a synchronization process having a synchronization recovery process for recovering from a failed synchronization session. The synchronization process with synchronization recovery 800 begins at block 801, where the mobile device 320 has initiated a synchronization session. The mobile device 320 generates a client request 324 based on updated object information stored in its mobile data 322. Processing continues at block 802.

At block 802, the synchronization application 342 receives the client request 324. The client request 324 includes the client manifest 404 that lists the updated object information in the mobile data 322. In one embodiment, if the mobile device 320 does not receive a client response 326 associated with an earlier client request 324, the mobile device 320 may repeat updated object information in the client manifest 404 that was included in the earlier client request. When this occurs, the information server 310 is unaware that the mobile device 320 has not received the client response 326 and the mobile device 320 is unaware that the information server 310 has already processed the earlier client request. Thus, in accordance with the present invention, the mobile device 320 repeats any updated object information in the next client manifest 404.

Figure 9:
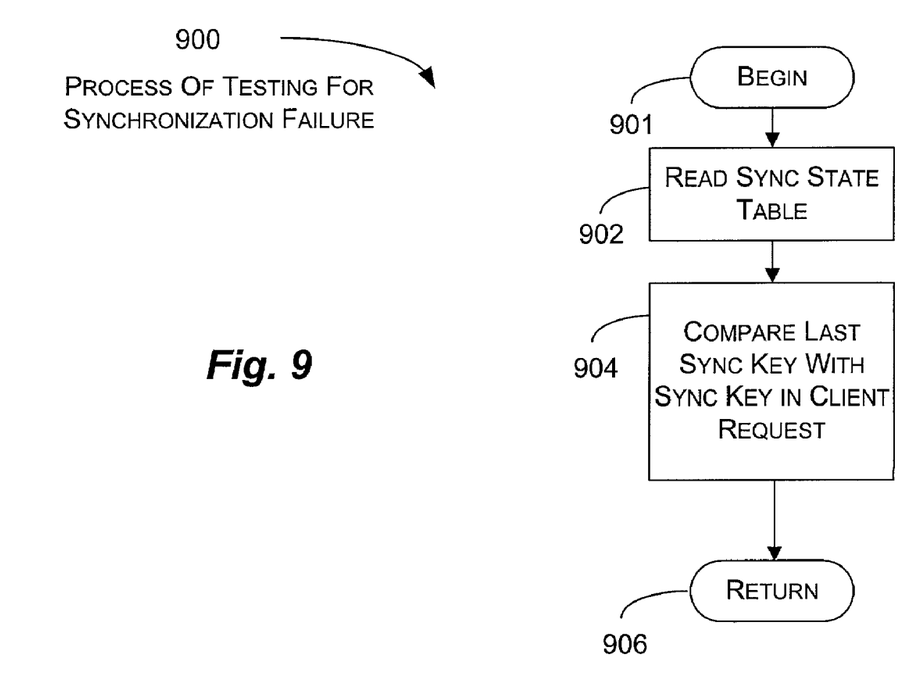
FIG. 9 is a logical flow diagram illustrating a recovery process suitable for use in FIG. 8, in accordance with one embodiment of the present invention.

At block 804, the synchronization application 342 tests whether there has been a synchronization failure. One embodiment is illustrated in FIG. 9 and implements the synchronization method described in the co-pending application entitled "SYNC KEY" referenced above. Briefly, as stated above, in that embodiment, an incrementing sync key is included in each client request. The sync key is incremented each time the mobile device 320 receives and successfully processes a client response 326 associated with the client request 324. For this embodiment, testing for a synchronization failure begins at block 901 and proceeds to block 902. At block 902, the synchronization application 342 reads the synchronization state table 344 to determine the value of the last sync key that is stored in the last sync key entry 702 (shown in FIG. 7). At block 904, the value in the last sync entry 702 is compared to the value in the sync key field 402 in the client request 324. Processing then returns to block 806 in FIG. 8.

At decision block 806, the synchronization application 342 determines whether there has been a synchronization failure. In the embodiment illustrated in FIG. 9 and described above, the synchronization application 342 bases the determination on the value in the last sync entry 702 and the value in the sync key field 402 of the client request 324. If the value of the sync key in the client request 324 is one more than the value stored in the state table, there has not been any synchronization failure and processing proceeds to block 810, where normal synchronization with the server data 312 is performed since there is no need to perform recovery. After the server data 312 is synchronized, the synchronization application 342 creates a client response 326.

At block 812, the synchronization application 342 sends the client response 326 to the mobile device 320. Once the mobile device 320 receives the client response 326 and processes the updates in the server manifest 414, the synchronization session is complete.

However, returning to decision block 806, when the synchronization application 342 determines that there has been a synchronization failure, processing proceeds to block 808. A synchronization failure will be detected, in the embodiment using sync keys described above, when the value in the last sync entry 702 is identical to the value in the sync key field 402 in the client request 324. One skilled in the art will appreciate that other synchronization methods may be used without departing from the scope of the present invention. For example, in another embodiment, the server may generate and update a sync key. In this embodiment, a synchronization failure is detected if the sync key for the client and the server are not identical and the sync key for the client is one less than the sync key for the server.

Figure 10:
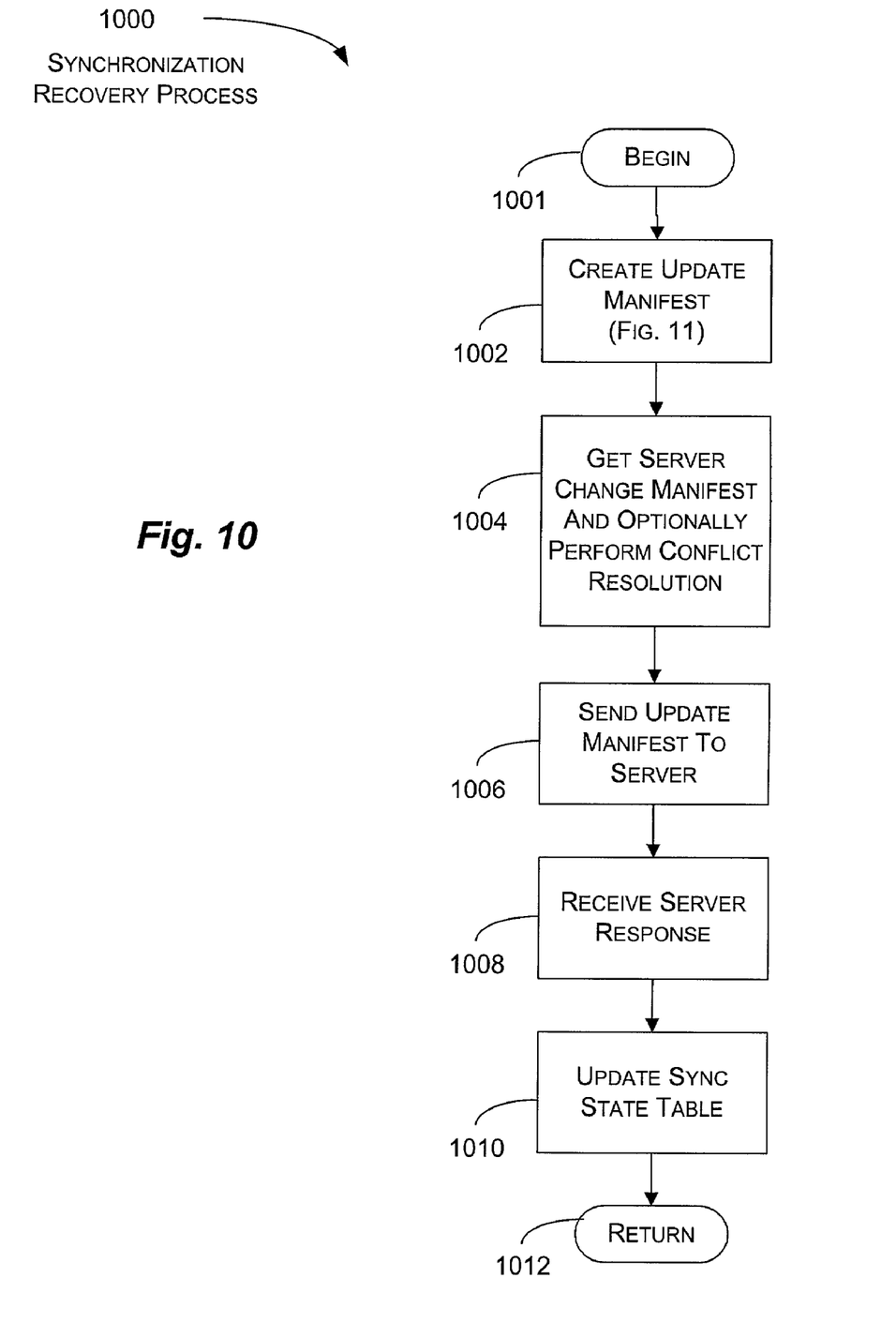
FIG. 10 is a logical flow diagram illustrating one embodiment of a synchronization recovery process suitable for use in FIG. 8.

Briefly, at block 808, the synchronization application 342, in accordance with the present invention, accesses its synchronization state table 344 to determine the state of both the information server 310 and the mobile device 320 so that duplicate objects are not created in the server data 312 when the server data 312 and the mobile data 322 become synchronized. One embodiment of the synchronization recovery process is illustrated in FIG. 10 and described below. Once the synchronization recovery process is completed, processing proceeds to block 812 as described above and ends at end block 814.

FIG. 10 is a logical flow diagram illustrating one embodiment of a synchronization recovery process 1000 suitable for use in FIG. 8. The synchronization recovery process 1000 begins at block 1001, after the synchronization application 342 has determined that there has been a synchronization failure. Processing continues at block 1002.

Figure 11:
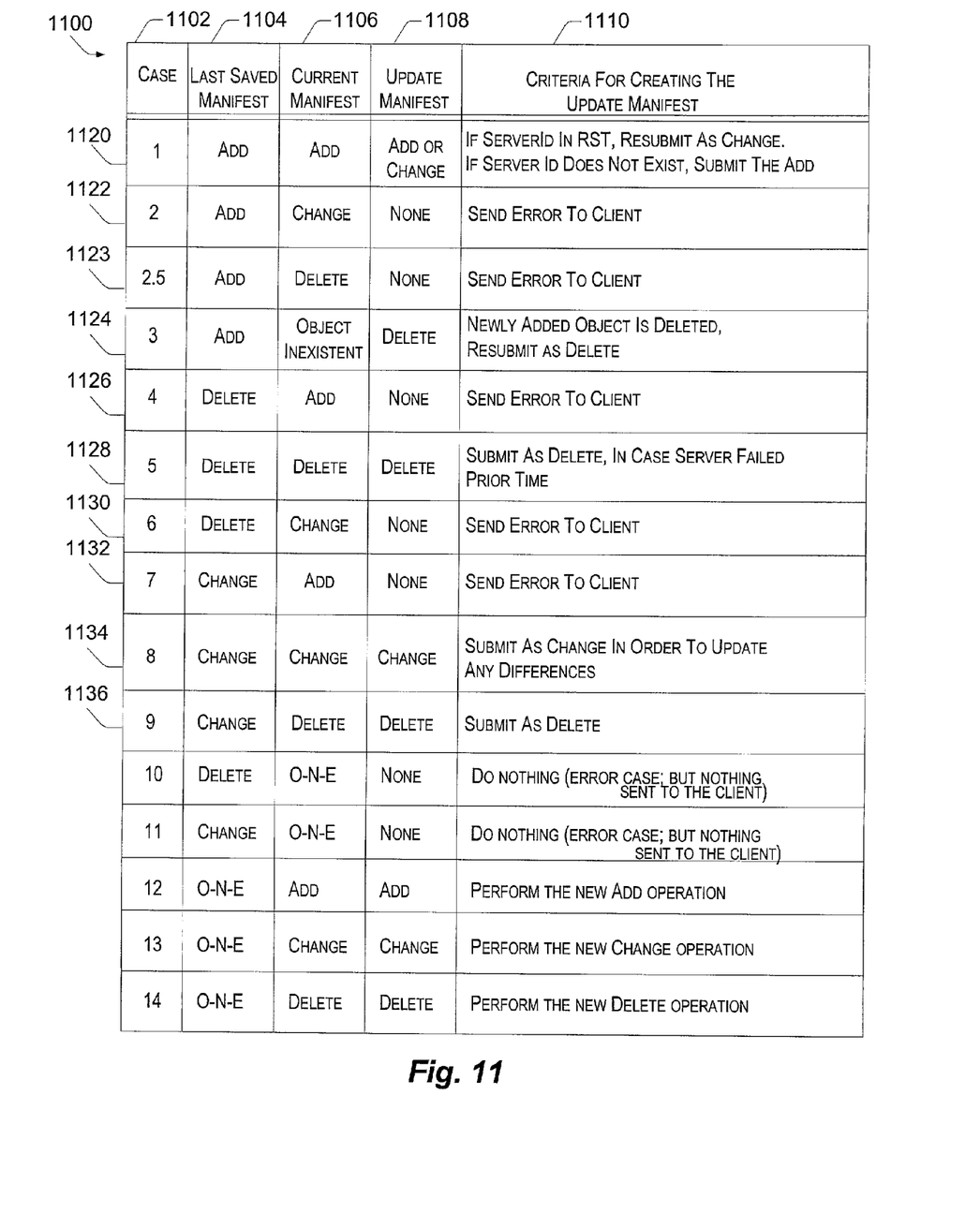
FIG. 11 is a table illustrating various outcomes for the update manifest based on various conditions.

At block 1002, the synchronization application 342 creates an update manifest 504 which will be sent in the server request 352. Briefly, the update manifest 504 is based on the last saved manifest located in the synchronization state table 344 and the current client manifest 404 included within the client request 324. The update manifest 504 and client manifest 324 may have the same format. An example of one embodiment of the format is illustrated in FIG. 6 and described above. The creation of the update manifest 504, in accordance with the present invention, allows the mobile data 322 and the server data 312 to become synchronized without duplicating objects in either location and without sending client errors to the information server 310. The criteria for creating the update manifest 504 is illustrated in FIG. 11 and described below. Processing continues at block 1004.

At block 1004, conflict resolution may optionally be performed. In general, when conflict resolution is performed, the synchronization application resolves conflicts with objects in the mobile data and the server data. In one embodiment, the synchronization application performs conflict resolution by comparing a server manifest with a client manifest to determine any conflicts. The conflicts may then be resolved using predetermined criteria, such as always keep the mobile data object. Processing continues at block 1006.

At block 1006, the update manifest 504 is sent to the information server 301. The information server performs any updates to the server data 312. The information server then sends the server response 354 to the synchronization application 342. Processing continues at block 1008.

At block 1008, the synchronization application 342 receives the server response 354. Once the server response 354 is received, the synchronization application 342 updates the synchronization state table 344 at block 1010. In general, the synchronization application 342 stores the sync key 402 and the client manifest 404 from the client request 324 in the last sync key entry 702 and last manifest entry 708, respectively. The synchronization application 342 stores the watermark 512 from the server response 354 in the watermark entry 704 of the synchronization state table 344. Once the synchronization state table 344 is updated, the synchronization application 342 builds the client response 326 that, in one embodiment, includes the sync key 412 and the server manifest 414. The synchronization recovery process is then complete. Processing continue to return block 1014 which returns to block 812 in FIG. 8 and proceeds as described above.

FIG. 11 is a table illustrating various outcomes for the update manifest based on various conditions of the last manifest and the current manifest that may occur in accordance with one embodiment of the present invention. In the table 1100, there are five columns of information: a case column 1102, a last saved manifest column 1104, a current manifest column 1106, an update manifest column 1108 and a criteria for creating the update manifest column 1110. The case column 1102 identifies one of several cases that the synchronization application 342 may incur while creating the update manifest. In the table 1100 shown, there are nine such cases 1120–1136. The last saved manifest column 1104 identifies an action 601 for an object as specified in the client manifest for which the information server 310 has completed processing. This information is obtained from the synchronization state table 344. Typically, the action 601 may include an "ADD", a "DELETE", or a "CHANGE". The current manifest column 1106 identifies the action for the same object as specified in the current client manifest 404 received by the synchronization application 342. The update manifest column 1108 identifies the action for the object based on the action specified in the last saved manifest column 1104 and the current manifest field 1106 using the criteria specified in column 1110. The abbreviation "O-N-E" means the object is non-existent.

In general, the criterion listed in column 1110 insures that the number of duplicate objects created in the server data 312 or the mobile data 322 is minimized and that proper update commands are sent to the server. For case 1, entry 1120, if the object is specified as an "ADD" in both the last saved manifest and the current manifest, the update manifest may specify the object as an "ADD" or "CHANGE" depending on whether the object has an associated serverId in the synchronization state table 344. The serverID is identified in the ID column 603 of the sample manifest 600 illustrated in FIG. 6. If there is an associated serverId, the synchronization application 342 knows that the information server 310 has already successfully added this object and the update manifest should specify the object as a "CHANGE" in order to incorporate any differences between the manifests. However, if an associated serverID is not in the synchronization state table, the synchronization application 342 knows that the information server 310 failed to add this object during the last synchronization session. Therefore, the synchronization application 342 specifies an "ADD" for the object in the update manifest.

For case 2, entry 1122, if the object is specified as an "ADD" in the last saved manifest and is specified as a "CHANGE" in the current manifest, the synchronization application 342 will not include the object in the update manifest and will instead return an error to the mobile device. Alternatively, the "CHANGE" specification may be included in current manifest.

For case 3, entry 1124, if the object is specified as an "ADD" in the last saved manifest and is non-existent in the current manifest, the synchronization application 342 will specify a "DELETE" for the object in the update manifest. This case occurs when the mobile device 320 deletes an object after including it in a sync manifest, but before receiving confirmation that the information server properly added the object in response to an earlier client request. Alternatively, the "DELETE" specification may be included in current manifest.

For case 4, entry 1126, if the object is specified as a "DELETE" in the last saved manifest and specified as an "ADD" in the current manifest, the synchronization application 342 will not include the object in the update manifest and will instead return an error to the mobile device.

For case 5, entry 1128, if the object is specified as a "DELETE" in the last saved manifest and specified as a "DELETE" in the current manifest, the synchronization application 342 will specify a "DELETE" in the update manifest. For this case, even if the information server had successfully performed the "DELETE" in the prior failed synchronization session, by performing the "DELETE" again, the error message stating that the object does not exist will be ignored and the "DELETE" will be successful.

For case 6, entry 1130, if the object is specified as a "DELETE" in the last saved manifest and specified as a "CHANGE" in the current manifest, the synchronization application 342 will not include the object in the update manifest and will instead return an error to the mobile device.

For case 7, entry 1132, if the object is specified as a "CHANGE" in the last saved manifest and specified as an "ADD" in the current manifest, the synchronization application 342 will not include the object in the update manifest and will instead return an error to the mobile device.

For case 8, entry 1134, if the object is specified as a "CHANGE" in the last saved manifest and specified as a "CHANGE" in the current manifest, the synchronization application 342 will specify a "CHANGE" for the object in the update manifest. This will allow any differences in the object to be properly included on the server data 312.

For case 9, entry 1136, if the object is specified as a "CHANGE" in the last saved manifest and specified as a "DELETE" in the current manifest, the synchronization application 342 will specify a "DELETE" for the object in the update manifest. Because the mobile device 320 does not wish to keep the object anymore, the changes from the last saved manifest are not needed.

The remaining entries (2.5, 10, 11, 12, 13, 14) are included as further examples of outcomes for the update manifest based on various conditions of the last manifest and the current manifest that may occur in one illustrative embodiment. One skilled in the art will appreciate that the actions illustrated in FIG. 11 may be changed based on an agreement between the client and server without departing from the scope of the present invention. Thus, by maintaining the synchronization state table 344 in accordance with the present invention, the present invention can reduce the number of duplicate objects in the server data 312 and the mobile data 322 due to failed synchronization sessions. While the described embodiment of this invention uses wireless technology due to its tendency for lost or terminated sessions, the invention may be implemented using fixed devices without departing from the spirit of the invention.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for recovering from a failed synchronization session between a mobile device and a server, comprising:
  a) receiving a client request for a synchronization session, wherein the client request includes a manifest comprising changes to a data store after a prior successful synchronization session;
  b) determining whether a prior synchronization session failed; and
  c) if the prior synchronization session failed,
    1) creating a server request based on the client request and on a synchronization state associated with the failed prior synchronization session so that duplicate objects are not created in the server when the mobile device and the server become synchronized;
    2) sending the server request to the server for processing;
    3) receiving a server response from the server based on the processing of the server request at the server;
    4) modifying the synchronization state based on the server response and the client request;
    5) creating a client response based on the server response; and
    6) sending the client response to the mobile device.

2. The computer-implemented method of claim 1, wherein the client request includes a sync key that updates to a pre-determined value each time the client request for the synchronization session is successful, the synchronization state includes a last sync key and determining whether the prior synchronization session failed comprises comparing the sync key in the client request with the last sync key.

3. The computer-implemented method of claim 2, wherein the prior synchronization session is determined to have failed if the sync key in the client request is one less than the last sync key.

4. The computer-implemented method of claim 1, wherein the changes include changes from a prior manifest associated with the synchronization session that failed.

5. The computer-implemented method of claim 1, wherein the server request includes an update manifest, the update manifest comprises one or more objects and an update action associated with each of the one or more objects, the update action being based on the client request and the synchronization state.

6. The computer-implemented method of claim 5, wherein the client request includes a manifest and at least one of the one or more objects in the update manifest does not have a corresponding object in the manifest of the client request.

7. The computer-implemented method of claim 5, wherein the update action is based on a current action specified in the client request and a last action specified in the synchronization state.

8. The computer-implemented method of claim 7, wherein the update action is identical to the current action.

9. The computer-implemented method of claim 7, wherein the update action is identical to the last action.

10. The computer-implemented method of claim 7, wherein the update action is different than the current action and the last action.

11. The computer-implemented method of claim 1, wherein the synchronization state includes a last manifest associated with a manifest in the client request for the prior synchronization session that lists changes to a mobile data store after a prior successful synchronization session, a watermark identifying a state within a server store at which the server has synchronized the server store, a prior watermark which identifies a prior state of the watermark.

12. The computer-implemented method of claim 1, further comprising storing the synchronization state to a non-volatile storage media.

13. A computer-readable storage medium having computer-executable components with instructions for recovering from a failed synchronization session between a first data store and a second data store, comprising: a synchronization component configured to detect a failed synchronization session based on a client synchronization request and a synchronization state and to perform a synchronization recovery upon detecting the failed synchronization session, the synchronization recovery comprising:

creating an update manifest based on the synchronization state and the synchronization request, wherein the synchronization state includes a last client manifest associated with the failed synchronization session, a watermark identifying a state with the second data store at which the second data store synchronized, wherein the update manifest includes changes to the first data store that were not provided in a prior synchronization request and excludes changes provided in the synchronization request that were previously updated on the second data store during the failed synchronization session; and sending the update manifest to a device configured to update the second data store.

14. The computer-readable storage medium of claim 13, wherein the watermark comprises a collblob.

15. The computer-readable storage medium of claim 13, wherein the synchronization component is further configured to store the synchronization state to a non-volatile storage media.

16. The computer-readable storage medium of claim 13, wherein the synchronization component is further configured to store the synchronization state to a directory associated with the synchronization component.

17. A system for recovering from a failed synchronization session between a first data store and a second data store, comprising:

a first device associated with the first data store;

a second device associated with the second data store; and a server coupled to a storage medium on which a synchronization state associated with a first synchronization session is stored, the server configured to access the synchronization state upon receiving a subsequent synchronization request and to determine whether the subsequent synchronization request corresponds to the first synchronization session, if the synchronization request corresponds to the first synchronization session, the server is configured to initiate a recovery synchronization session, wherein the server is further configured to exclude changes provided in the first synchronization session that were previously updated, wherein the recovery process includes creating an update manifest based on the synchronization state and the subsequent synchronization request and sending the update manifest for processing on the second device, the update manifest includes changes to the first data store that were not previously updated on the second data store and excludes changes provided in the subsequent synchronization request that were previously updated on the second data store during the failed synchronization session.

18. The system of claim 17, wherein the second device comprises the server.

19. The system of claim 17, wherein the subsequent synchronization request corresponds to the first synchronization session when a sync key in the subsequent synchronization request is one less than a last sync key stored in the synchronization state.

* * * * *